(12) United States Patent
Gaskins

(10) Patent No.: US 7,457,718 B2
(45) Date of Patent: Nov. 25, 2008

(54) APPARATUS AND METHOD FOR DYNAMIC CONFIGURATION OF TEMPERATURE PROFILE IN AN INTEGRATED CIRCUIT

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/626,305

(22) Filed: Jan. 23, 2007

(65) Prior Publication Data

US 2007/0116085 A1 May 24, 2007

Related U.S. Application Data

(62) Division of application No. 11/277,104, filed on Mar. 21, 2006, now Pat. No. 7,225,100.

(60) Provisional application No. 60/696,703, filed on Jul. 5, 2005.

(51) Int. Cl.
*G01K 1/00* (2006.01)
*G06F 15/00* (2006.01)
(52) U.S. Cl. .................................. 702/132
(58) Field of Classification Search ................. 702/132
See application file for complete search history.

(56) References Cited

U.S. PATENT DOCUMENTS

| | | | |
|---|---|---|---|
| 5,544,138 A | 8/1996 | Bajorek et al. | |
| 5,557,557 A | 9/1996 | Frantz et al. | |
| 5,719,800 A | 2/1998 | Mittal et al. | |
| 5,815,724 A | 9/1998 | Mates | |
| 5,926,641 A | 7/1999 | Shay | |
| 5,996,083 A | 11/1999 | Gupta et al. | |
| 6,233,691 B1 | 5/2001 | Atkinson | |
| 6,438,697 B2 | 8/2002 | Atkinson | |
| 2003/0158697 A1 | 8/2003 | Gold et al. | |
| 2004/0204899 A1* | 10/2004 | Gunther et al. | ............. 702/132 |
| 2006/0020838 A1 | 1/2006 | Tschanz et al. | |
| 2006/0161373 A1* | 7/2006 | Mangrulkar et al. | ........ 702/130 |

FOREIGN PATENT DOCUMENTS

CN 03273584.7 1/2005

* cited by examiner

*Primary Examiner*—Michael P. Nghiem
*Assistant Examiner*—Cindy H Khuu
(74) *Attorney, Agent, or Firm*—Gary R. Stanford; Richard K. Huffman; James W. Huffman

(57) ABSTRACT

A method of dynamically configuring a temperature profile in an integrated circuit (IC). The method includes sensing temperature of the IC, configuring a reduced operating temperature range for the IC, and modulating at least one control mechanism to maintain the temperature of the IC within the reduced operating temperature range. The configuring includes precluding configuration of the reduced operating temperature range at unauthorized privilege levels.

9 Claims, 1 Drawing Sheet

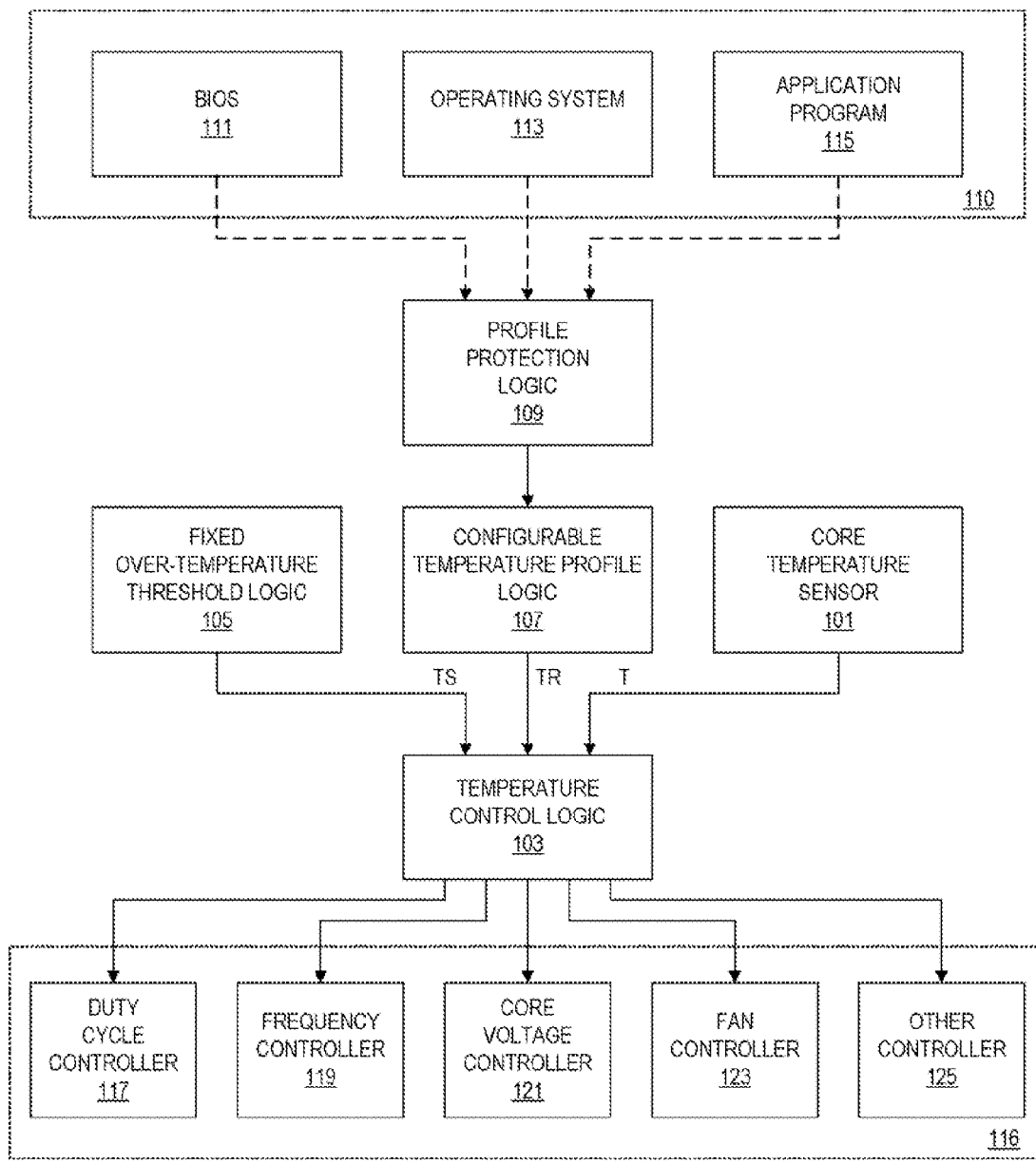

2

APPARATUS AND METHOD FOR DYNAMIC CONFIGURATION OF TEMPERATURE PROFILE IN AN INTEGRATED CIRCUIT

CROSS-REFERENCE TO RELATED APPLICATIONS

This application is a divisional of U.S. patent application Ser. No. 11/277,104, filed on Mar. 21, 2006.

U.S. patent application Ser. No. 11/277,104, now U.S. Pat. No. 7,225,100, claims the benefit of, and incorporates by reference, U.S. Provisional Application Ser. No. 60/696,703, filed on Jul. 5, 2005.

BACKGROUND OF THE INVENTION

1. Field of the Invention

The present invention relates to integrated circuits, and more particularly to dynamic configuration of the temperature profile in an integrated circuit which solves the problems associated with controlling the temperature at which an integrated circuit operates.

2. Description of the Related Art

Many present day integrated circuits have provisions for controlling their operating temperature. For example, in a present day microprocessor, logic is provided therein to sense core operating temperature and to keep the operating temperature within some fixed range typically by modulating the operating frequency and/or operating voltage of the part. Generally, an over-temperature threshold is programmed into a read-only register during manufacturing test and if the core temperature of the part exceeds this threshold during operation, control logic steps down the core frequency and/or core operating voltage in order to bring the core temperature back into acceptable range.

The above technique for controlling temperature is disadvantageous from the perspective of a user or system integrator because it cannot be dynamically configured. For example, consider a systems integrator that desires to manufacture "green" systems, that is, systems that do not require what may be considered as undue amounts of energy. Alternatively, consider a laptop user who requires use of a laptop computer over a very long period of time without the capability to recharge. Moreover, consider a laptop user that is sensitive to heat and does not have the ability to situate their laptop computer in any place other than their lap.

It is desired to enable the user or system integrator to dynamically configure the operating temperature profile in an integrated circuit, such as a microprocessor or the like.

SUMMARY OF THE INVENTION

An integrated circuit (IC) according to an embodiment of the present invention includes a temperature sensor, configurable temperature profile logic, at least one controller, and temperature control logic. The temperature sensor provides an operating temperature value. The configurable temperature profile logic provides a configured operating temperature range. The temperature control logic has a first input receiving the operating temperature value, a second input receiving the configured operating temperature range, and at least one output coupled to each controller. The temperature control logic controls one or more controllers to maintain the operating temperature value within the configured operating temperature range.

The IC may include an interface mechanism that enables external configuration of the configurable temperature profile logic. The interface mechanism may be any one or more of a system BIOS interface, an operating system interface and an application program interface. Profile protection logic may be provided to preclude configuration of an operating temperature range at an unauthorized privilege level. The controller may be any selected combination of a duty cycle controller, a frequency controller, a core voltage controller, a fan controller, and a functional block controller. The configuiable temperature profile logic may be a register or the like, such as a machine specific register.

The IC may further include over-temperature threshold logic which provides a maximum operating temperature range to the temperature control logic. In this case, the temperature control logic controls each controller to maintain the operating temperature value within either the maximum or the configured operating temperature range.

A microprocessor according to an embodiment of the present invention includes a core temperature sensor which provides an operating temperature, over-voltage threshold circuitry which provides a maximum operating temperature range, configurable temperature profile circuitry which provides a reduced operating temperature range, one or more controllers, and temperature control circuitry. The temperature control circuitry operates the one or more controllers to maintain the operating temperature value within a selected one of the maximum operating temperature range and the reduced operating temperature range.

The microprocessor may include an interface mechanism that enables access to the configurable temperature profile circuitry to specify the reduced operating temperature range. The interface mechanism may be a selected one of a system BIOS interface, an operating system interface, and an application program interface. The microprocessor may further include profile protection circuitry which precludes configuration of the reduced operating temperature range at an unauthorized privilege level. The one or more controllers may include any selected combination of a duty cycle controller, a frequency controller, a core voltage controller, a fan controller, and a functional block controller.

A method of dynamically configuring a temperature profile in an IC according to an embodiment of the present invention includes sensing temperature of the IC, configuring a reduced operating temperature range for the IC, and modulating at least one control mechanism to maintain the temperature of the IC within the reduced operating temperature range. The configuring includes precluding configuration of the reduced operating temperature range at unauthorized privilege levels.

The method may include programming via an interface mechanism, such as programming via a selected one of a system BIOS interface, an operating system software interface and an application program interface. The method may include programming a register. The method may include modulating either one of operating frequency and core voltage. The method may include modulating a rate of instruction execution. The method may include selectively activating a fan. The method may include selectively activating a functional block of the IC.

BRIEF DESCRIPTION OF THE DRAWING(S)

The benefits, features, and advantages of the present invention will become better understood with regard to the following description, and accompanying drawings in which the sole FIGURE is a block diagram illustrating dynamically controlling the operating temperature of an integrated circuit according to one or more exemplary embodiments of the present invention.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventor has noted the situations noted above and similar scenarios where problems exist because of the fixed nature of present day integrated circuit operating temperature controls. He has therefore developed a system and method which enables dynamic configuration of the temperature profile in an integrated circuit that solves the problems associated with controlling the temperature at which an integrated An advantage of the present circuit operates, as will be further described below with respect to the sole FIGURE.

The sole FIGURE is a block diagram illustrating dynamically controlling the operating temperature of an integrated circuit (IC) 100 according to one or more exemplary embodiments of the present invention. In one embodiment, the integrated circuit 100 is configured as a microprocessor. The integrated circuit 100 has a core temperature sensor 101 that provides a core operating temperature value T to temperature control logic 103. The temperature control logic 103 receives a "safe" or maximum operating temperature range TS from fixed over-temperature threshold logic 105, as described hereinabove. In contrast to present day integrated circuits, the integrated circuit 100 also includes configurable temperature profile logic 107 that provides one or more configured operating temperature ranges TR to the temperature control logic 103.

The safe operating temperature range TS is generally determined as the maximum allowable temperature range for the integrated circuit 100 to achieve maximum performance without resulting in damage to any of the circuitry on the IC. When the temperature T approaches or otherwise exceeds a maximum temperature value or threshold indicated by TS, the temperature control logic 103 takes the appropriate measures, described further below, to reduce the temperature T to avoid damage or catastrophic failure of the integrated circuit 100. It may be desired, however, to operate the integrated circuit 100 at a configured temperature range, as indicated by TR, for various reasons. Each "configured" temperature range is a temperature range that is reduced relative to the safe or maximum temperature range TS. For example, the integrated circuit 100 may be implemented to operate in a "green" system for environmentally sensitive applications or products in which the operating temperature is reduced to conserve energy. Or, the manufacturer of the system incorporating the integrated circuit 100 may generally maintain the integrated circuit 100 at a reduced temperature to extend the overall life of the system over time. Or, the user of the system incorporating the integrated circuit 100 may desire to reduce operating temperature of the integrated circuit 100 to extend battery life or to reduce the amount of heat radiated from the system.

The one or more configured operating temperature ranges TR can be established at various levels of configuration protection according to different embodiments. In one embodiment, profile protection logic 109 is provided to preclude configuration of the one or more configured operating temperature ranges at unauthorized privilege levels. In an x86-compatible embodiment, such protection precludes modification of the configurable temperature profile logic 107 at levels other than the highest protection level (e.g., ring 0 or operating system kernel protection level). Such configuration may be used to enforce a predetermined reduced temperature range, such as a green system or a reduced-temperature system designed for extended life. In alternative embodiments, the present invention contemplates modification of the configurable temperature profile logic 107 by a user via any one or more interface mechanisms 110. The interface mechanisms 110 include, for example, a system BIOS (basic input/output system) interface 111, an operating system software interface 113, and an application programs interface 115. External access is provided to enable modification by a user via any combination of the illustrated interface mechanisms 110. Other access techniques are contemplated as well. In one embodiment, the configurable temperature profile logic 107 is implemented as a machine specific register in a microprocessor that is written at the highest privilege level (e.g., privilege level 0) by operating system software via the operating system software interface 113.

Responsive to inputs TS, TR and T provided by the fixed over-temperature threshold logic 105, the configurable temperature profile logic 107, and the core temperature sensor 101, respectively, the temperature control logic 103 controls the temperature of the integrated circuit 100 via one or more control mechanisms 116. Accordingly, in various embodiments, the present invention contemplates one or more control mechanisms 116, including a duty cycle controller 117, a frequency controller 119, a core voltage controller 121, a fan controller 123, and other controllers 125. The temperature control logic 103 controls the operating temperature within a selected operating range indicated by TS and TR. The TS input may be configured as the default operating temperature range for maximum performance, whereas the TR input is provided to reduce operating temperature for any of the reasons specified herein.

In operation, the duty cycle controller 117 modulates the rate at which control instructions are provided to execution logic (not shown) for execution by the integrated circuit 100. For example, in a pipeline device such as a microprocessor, the duty cycle controller controls the rate at which microprocessor instructions are issued for execution. The frequency controller 119 modulates core operating frequency of the integrated circuit 100 and may be controlled in conjunction with a core voltage controller 121. The core voltage controller 121 modulates core voltage (e.g., "Vdd") of the integrated circuit 100. A fan controller 123 selectively activates (turns on or off) an attached fan or other cooling device (not shown). The "other" controller 125 contemplates any other known or contemplated mechanisms for controlling temperature of the integrated circuit 100. For example, in a microprocessor embodiment, the other controller 125 includes logic for turning off certain logic functional blocks therein such as an optional L2 cache or any other one or more optional functional blocks that are selectively activated or enabled to improve throughput but that are not essential for operation.

An advantage of the present invention is that operating thresholds can now be dynamically configured for any one or more of a variety of purposes, such as to preserve battery life, to extend the overall life of the integrated circuit 100, or to reduce heat Operating the integrated circuit 100 at reduced temperature generally extends the life and reliability of the integrated circuit 100 as understood by those of ordinary skill in the art.

Although the present invention has been described in considerable detail with reference to certain preferred versions thereof, other versions and variations are possible and contemplated. Those skilled in the art should appreciate that they can readily use the disclosed conception and specific embodiments as a basic for designing or modifying other structures for carrying out the same purposes of the present invention without departing from the spirit and scope of the invention as defined by the appended claims.

What is claimed is:

1. A method of dynamically configuring a temperature profile in an integrated circuit (IC), comprising:
   sensing temperature of the IC;
   configuring a reduced operating temperature range for the IC, that is a range of temperatures over which the IC is allowed to operate, wherein said configuring comprises precluding configuration of the reduced operating temperature range at unauthorized privilege levels; and
   modulating at least one control mechanism to maintain the temperature of the IC within the reduced operating temperature range.

2. The method of claim 1, wherein said configuring a reduced operating temperature range for the IC comprises programming via an interface mechanism.

3. The method of claim 2, wherein said programming via an interface mechanism comprises programming via a selected one of a system BIOS interface, an operating system software interface and an application program interface.

4. The method of claim 1, wherein said configuring a reduced operating temperature range for the IC comprises programming a register.

5. The method of claim 1, wherein said modulating at least one control mechanism comprises modulating either one of operating frequency and core voltage.

6. The method of claim 1, wherein said modulating at least one control mechanism comprises modulating a rate of instruction execution.

7. The method of claim 1, wherein said modulating at least one control mechanism comprises selectively activating a fan.

8. The method of claim 1, wherein said modulating at least one control mechanism comprises selectively activating a functional block of the IC.

9. The method of claim 1, wherein said precluding comprises protecting modification of the reduced operating temperature range at levels other than operating system kernel protection level.

* * * * *